United States Patent
Lu et al.

(10) Patent No.: US 9,483,416 B1
(45) Date of Patent: Nov. 1, 2016

(54) SECURE PROCESSOR OPERATION USING INTEGRATED CIRCUIT CONFIGURATION CIRCUITRY

(75) Inventors: Ting Lu, Austin, TX (US); Stephen M. Trimberger, San Jose, CA (US); Eric E. Edwards, Albuquerque, NM (US); Weiguang Lu, San Jose, CA (US); Kam-Wing Li, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 962 days.

(21) Appl. No.: 12/909,493

(22) Filed: Oct. 21, 2010

(51) Int. Cl.
*G06F 12/14* (2006.01)
*G06F 11/30* (2006.01)

(52) U.S. Cl.
CPC .............. *G06F 12/14* (2013.01); *G06F 11/30* (2013.01)

(58) Field of Classification Search
CPC ... G06F 21/76; G06F 21/57; G06Q 20/3829; H04L 63/0428
USPC ........................................................ 713/189
See application file for complete search history.

(56) References Cited

U.S. PATENT DOCUMENTS

| | | | |
|---|---|---|---|
| 6,172,520 B1 * | 1/2001 | Lawman ............. | G06F 17/5054 326/38 |
| 6,324,676 B1 * | 11/2001 | Burnham et al. ............. | 716/117 |
| 6,345,101 B1 * | 2/2002 | Shukla ........................... | 713/150 |
| 6,457,125 B1 * | 9/2002 | Matthews et al. ............ | 713/160 |
| 6,550,011 B1 * | 4/2003 | Sims, III ................ | G06F 21/10 365/52 |
| 6,573,748 B1 * | 6/2003 | Trimberger ...... | H03K 19/17744 326/38 |
| 6,738,962 B1 * | 5/2004 | Flaherty et al. .............. | 716/117 |
| 6,759,869 B1 * | 7/2004 | Young .............. | H03K 19/17736 326/38 |
| 6,823,069 B1 * | 11/2004 | Kitajima et al. ................ | 380/44 |
| 7,162,644 B1 * | 1/2007 | Trimberger ......... | G06F 12/1425 326/8 |
| 7,197,647 B1 * | 3/2007 | Van Essen .......... | H04L 63/0428 380/277 |
| 7,366,306 B1 * | 4/2008 | Trimberger ......... | G06F 12/1425 326/8 |
| 7,607,005 B1 * | 10/2009 | Lewis ........................... | 713/100 |
| 7,636,802 B1 * | 12/2009 | Baxter ............. | H03K 19/17744 710/33 |
| 7,783,897 B2 * | 8/2010 | McLean .................. | G06F 21/76 713/100 |
| 7,975,151 B2 * | 7/2011 | Coenen ........................ | 713/193 |
| 2006/0059574 A1 * | 3/2006 | Fayad .............. | H03K 19/17768 726/34 |
| 2008/0313453 A1 * | 12/2008 | Booth .................... | G06F 21/575 713/2 |
| 2010/0272255 A1 * | 10/2010 | Devadas ................. | G06F 21/31 380/44 |
| 2011/0216247 A1 * | 9/2011 | Nishida ......................... | 348/725 |
| 2011/0231628 A1 * | 9/2011 | Gelter ................. | G06F 17/5027 711/171 |

OTHER PUBLICATIONS

Taylor, Brad and Wittig, Ralph, "28nm Generation Programmable Families", 7 Series FPGAs, Extensible Processing Platform Family, AMBA AX14 IP, Aug. 8, 2010, pp. 1-25, Xilinx, 2100 Logic Drive, San Jose, CA 95124.
Nass, Rich, "Xilinx puts ARM Core into its FPGAs", EE Times, 2 pp., Apr. 27, 2010, available at http://www.eetimes.com/electronics-products/processors/4115523/Xilinx-puts-ARM-core-into-its-FPGA.

* cited by examiner

*Primary Examiner* — Brandon Hoffman
(74) *Attorney, Agent, or Firm* — Kevin T. Cuenot (57) ABSTRACT

A method of processor operation using an integrated circuit (IC) can include loading encrypted program code into the IC through a configuration port of the IC and decrypting the encrypted program code using configuration circuitry of the IC. Decryption of the encrypted program code can result in decrypted program code which can be provided to a target destination.

15 Claims, 4 Drawing Sheets

SECURE PROCESSOR OPERATION USING INTEGRATED CIRCUIT CONFIGURATION CIRCUITRY

FIELD OF THE INVENTION

One or more embodiments disclosed within this specification relate to integrated circuits (ICs). More particularly, one or more embodiments relate to secure processor operation using configuration circuitry of an IC.

BACKGROUND

Integrated circuits (ICs) can be programmed to perform specified functions. One type of IC is a programmable IC such as, e.g., the field programmable gate array (FPGA) which typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic circuitry. The programmable interconnect circuitry typically includes a large number of interconnect lines of varying lengths interconnected by programmable interconnect points (PIPs). The programmable logic circuitry implements the logic of a user design using programmable elements that can include, for example, function generators, registers, arithmetic logic, and so forth.

The programmable interconnect and programmable logic circuits are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs can also be implemented in other ways, e.g., using fuse or antifuse technology. The phrase "programmable IC" can include, but is not limited to these devices and further can encompass devices that are only partially programmable. For example, one type of programmable IC includes a combination of hard-coded transistor logic and a programmable switch fabric that programmably interconnects the hard-coded transistor logic.

A significant number of electronic systems that include programmable ICs also include processors. The programmable IC provides hardware flexibility and parallelization while the inclusion of a processor allows developers to include a variety of software related features. The processor, for example, can be configured to execute a modern and complex operating system providing an application level environment supporting feature development. This allows the system to take advantage of a large variety of existing, e.g., legacy, software libraries.

SUMMARY

One or more embodiments disclosed within this specification relate to integrated circuits (ICs) and, more particularly, to secure processor operation using configuration circuitry of an IC. One or more embodiments can include a method of processor operation using an IC. The method can include loading encrypted program code into the IC through a configuration port of the IC and decrypting the encrypted program code using configuration circuitry of the IC resulting in decrypted program code. The method also can include providing the decrypted program code to a target destination.

One or more other embodiments can include a system including an IC. The IC can include a configuration module configured to receive configuration data for the IC and encrypted program code and a decryptor coupled to the configuration module. The decryptor can be configured to decrypt configuration data for the IC that is encrypted and the encrypted program code. The decryptor further can be configured to generate decrypted program code. The system also can include a processor coupled to the IC. The processor can be configured to receive the decrypted program code.

One or more other embodiments can include an IC. The IC can include a configuration module configured to receive configuration data for the IC and encrypted program code. The IC also can include a decryptor coupled to an interface, wherein the decryptor is configured to decrypt configuration data for the IC that is encrypted and the encrypted program code. The decryptor further can be configured to generate decrypted program code. The IC also can include a processor coupled to the decryptor. The processor can be configured to receive the decrypted program code and, responsive to receiving the decrypted program code, implement a startup process. The configuration module can be operational to receive the encrypted program code and the decryptor can be operational to decrypt the encrypted program code without first loading configuration data specifying a circuit design into the IC.

DETAILED DESCRIPTION OF THE DRAWINGS

While the specification concludes with claims defining features of one or more embodiments that are regarded as novel, it is believed that the one or more embodiments will be better understood from a consideration of the description in conjunction with the drawings. As required, one or more detailed embodiments are disclosed within this specification. It should be appreciated, however, that the one or more embodiments are merely exemplary. Therefore, specific structural and functional details disclosed within this specification are not to be interpreted as limiting, but merely as a basis for the claims and as a representative basis for teaching one skilled in the art to variously employ the one or more embodiments in virtually any appropriately detailed structure. Further, the terms and phrases used herein are not intended to be limiting, but rather to provide an understandable description of the one or more embodiments disclosed herein.

One or more embodiments disclosed within this specification relate to integrated circuits (ICs) and, more particularly, to secure processor operation using configuration circuitry of an IC. In accordance with an embodiment disclosed herein, configuration circuitry available within an IC can be used to facilitate secure operations within a processor. The configuration circuitry of the IC is fully operational without having to first load configuration data specifying a circuit design into the IC to instantiate circuitry. The configuration circuitry of the IC typically includes decryption circuitry that is configured to decrypt configuration data provided to the IC to instantiate circuitry therein. The term "instantiated", as used within this specification in reference to a circuit design, refers to the formation or implementation of physical circuitry within the IC as specified by the circuit design or programmatic representation thereof that is loaded into the IC.

A processor can be configured to utilize this existing decryption functionality of the IC. Program code that is sent or distributed to the processor can be sent in an encrypted form. The encrypted program code can be provided to the IC and, more particularly, to the configuration circuitry within the IC. The configuration circuitry can decrypt the program code, or some portion thereof, and make the decrypted program code available to the processor for execution.

Figure 1:
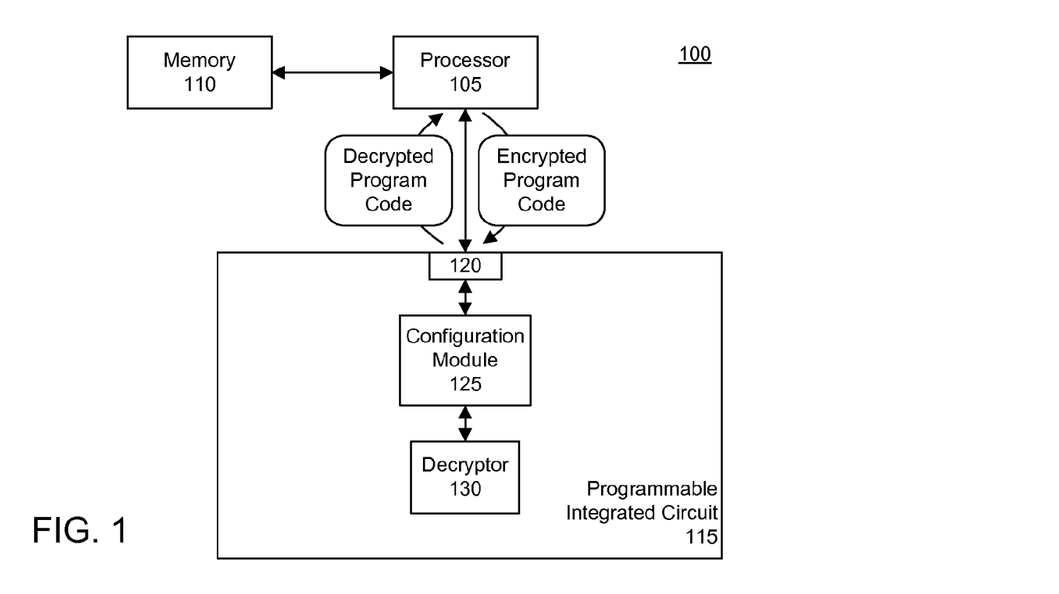
FIG. 1 is a first block diagram illustrating a system for secure processor operation in accordance with one or more embodiments disclosed within this specification.

FIG. 1 is a first block diagram illustrating system 100 for secure processor operation in accordance with one or more embodiments disclosed within this specification. As pictured, system 100 can include a processor 105, a memory 110, and an IC such as, e.g., programmable IC 115. For example, processor 105, memory 110, and programmable IC 115 can be mounted upon a circuit board, implemented within a larger system, or co-located within a single IC package.

Processor 105 can be implemented as any of a variety of different microprocessors or cores that are capable of executing program code. Memory 110 can be implemented as a random access memory (RAM). For example, memory 110 can be implemented as a dynamic RAM, a static RAM, and any of a variety of dual data rate (DDR) type RAMs, or the like. Memory 110 can be configured to store program code. Processor 105 can access the program code from memory 110 for execution. In this regard, memory 110 can be considered a runtime or execution memory for processor 105.

Programmable IC 115 can include a configuration port 120, a configuration module 125, and a decryptor 130. Configuration port 120 is coupled to configuration module 125. Configuration module 125 is coupled to decryptor 130. Each of configuration port 120, configuration module 125, and decryptor 130 can be implemented with "hard" circuitry, e.g., circuitry that is created within programmable IC 115 as part the manufacturing or fabrication process. As such, each of configuration port 120, configuration module 125, and decryptor 130 can be operational without having to first load configuration data specifying a circuit design into programmable IC 115.

In general, configuration module 125 can be configured to receive a bitstream specifying configuration data for programmable IC 115. When the configuration data is encrypted, configuration module 125 can provide the encrypted configuration data to decryptor 130. Decryptor 130 can decrypt the encrypted configuration data using a pre-stored key. Decryptor 130 then can provide the decrypted configuration data to configuration module 125. Configuration module 125, in turn, can store the decrypted configuration data within a configuration memory (not shown) of programmable IC 115, thereby instantiating circuitry, e.g., a circuit design, within programmable IC 115.

In accordance with an embodiment disclosed herein, the configuration circuitry, e.g., configuration port 120, configuration module 125, and decryptor 130, can be used to decrypt encrypted program code. The encrypted program code can be provided to programmable IC 115 in a same or similar format as would be the case for encrypted configuration data. The encrypted program code can be decrypted and provided to processor 105. In one or more embodiments, the encrypted program code can be decrypted without having to load configuration data within programmable IC 115 or otherwise instantiate circuitry within programmable IC 115.

In operation, encrypted program code that is to be executed by processor 105 can be loaded into programmable IC 115 through configuration port 120. In one or more embodiments, processor 105 can be operational, e.g., executing an operating system, and the encrypted program code can be executable program code such as an application to be executed by processor 105. In one or more other embodiments, however, the encrypted program code can be a boot image that is to be executed by processor 105 as part of a startup or boot process. Accordingly, processor 105 can be configured by executing the decrypted boot image.

In one or more embodiments, the encrypted program code can be provided to processor 105, which can forward the encrypted program code to configuration module 125 of programmable IC 115 via configuration port 120. For example, one or more bits in a header portion of a bitstream that includes the encrypted program code can indicate whether the bitstream, e.g., some or all, is encrypted. Processor 105, whether already executing an operating system or not yet booted, can be configured to examine the received bitstream to determine whether the selected bit(s) are set. Responsive to determining that the selected bit(s) are set, processor 105 can send or output the bitstream, including the encrypted program code, to programmable IC 115 for decryption.

In one or more other embodiments, the encrypted program code can be received from one or more other sources that are coupled to configuration module 125 via configuration port 120. To take advantage of functionality provided by configuration module 125 and decryptor 130, the encrypted program code must be formatted according to the syntax expected by configuration module 125 and decryptor 130. For example, the formatting of the encrypted program code must be that of encrypted configuration data that is loaded into programmable IC to instantiate a circuit design therein so that decryptor 130 can properly decrypt the encrypted program code.

Configuration module 125 can receive the encrypted program code and pass the encrypted program code to decryptor 130. Decryptor 130 can decrypt the encrypted program code using, for example, a pre-stored decryption key. Decrypted program code can be output from decyrptor 130 and sent back to configuration module 125. Configuration module 125 can output the decrypted program code to processor 105 via configuration port 120. Processor 105 can store the decrypted program code in memory 110 for execution.

The one or more embodiments described with reference to FIG. 1 illustrate that the encrypted program code can be received within, and the decrypted program code can be output from, the same port, e.g., configuration port 120. For example, configuration module 125 and decryptor 130 can be implemented in the form of an Internal Configuration Access Port module. As described with reference to FIG. 1, no configuration of programmable IC 115 is necessary to implement the decryption functionality described.

By utilizing the available functionality of programmable IC 115, program code that is to be executed by processor 105 can be sent via a network such as the Internet. The encrypted program code can be decrypted and executed by processor 105. When program code is a boot image, processor 105 can be configured to aid in startup activities of system 100. For example, processor 105 can be started or booted prior to startup of other components of system 100 such as programmable IC 115. By booting processor 105 though the secure boot process described, configuration of the larger system 100 can be simplified as processor 105 is available for performing any required tasks including configuration of programmable IC 115.

In one or more other embodiments, the encrypted program code that is to be decrypted by programmable IC 115 need not be an entire boot image or an entire application. For example, the encrypted program code can be a key that can be used by processor 105 to decrypt program code stored elsewhere within system 100.

Figure 2:
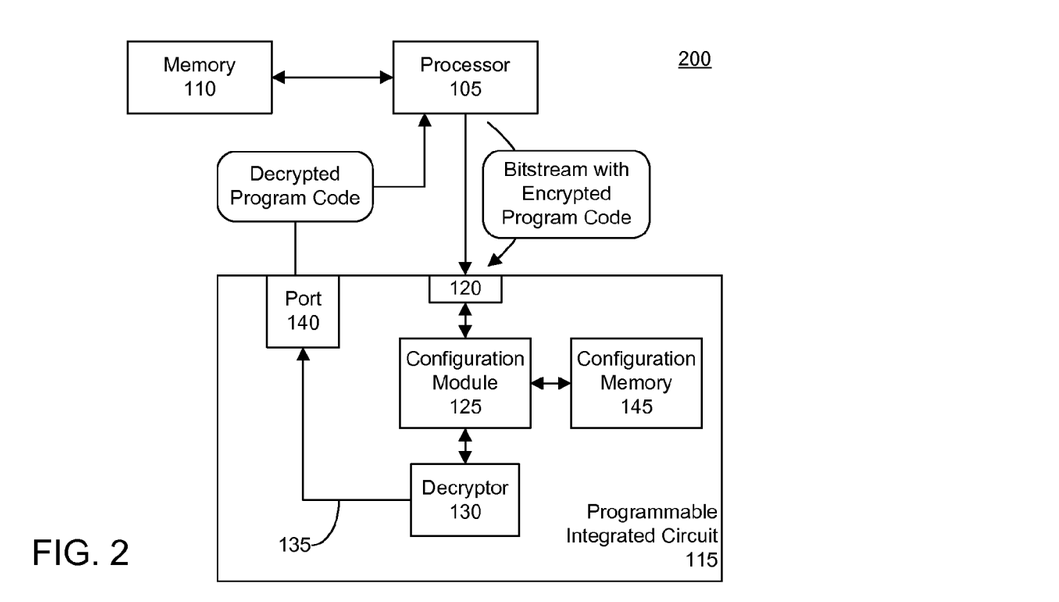
FIG. 2 is a second block diagram illustrating a system for secure processor operation in accordance with one or more other embodiments disclosed within this specification.

FIG. 2 is a second block diagram illustrating system 200 for secure processor operation in accordance with one or more other embodiments disclosed within this specification. FIG. 2 illustrates one or more embodiments in which additional circuitry is instantiated within programmable IC 115 to effectuate transfer of decrypted program code to processor 105. As shown, system 100 includes processor 105 coupled to memory 110. Programmable IC 115 includes configuration port 120, configuration module 125, decryptor 130, and configuration memory 145. It should be appreciated that while configuration memory 145 was not illustrated within FIG. 1 for purposes of clarity, programmable IC 115 does include a configuration memory. In addition, signal routing circuitry 135 and port 140 can be instantiated within programmable IC 115 as described below. Like numbers will be used to refer to the same items throughout this specification to the extent possible.

System 200 can function largely as described with reference to FIG. 1. When receiving the encrypted program code, however, configuration data that specifies circuitry to be instantiated within programmable IC 115 also can be received. In one or more embodiments, encrypted program code can be included or otherwise encapsulated within a bitstream that specifies or includes configuration data provided to programmable IC 115. For example, markers or identifiers within the configuration data can indicate which portions of the bitstream are encrypted program code and which portions of the bitstream are configuration data for programmable IC 115. The configuration data of the bitstream may be encrypted or may not be encrypted.

Responsive to receiving the bitstream via configuration port 120, configuration module 125 can distinguish between those portion(s) of the bitstream that are encrypted program code and those portion(s) that are configuration data. Accordingly, configuration module 125 can load configuration data into configuration memory 145. Loading configuration data into configuration memory 145 instantiates, or forms, signal routing circuitry 135 and port 140 within programmable IC 115. It should be appreciated that without loading of configuration data into configuration memory 145, port 120 and signal routing circuitry 135 would not exist or be formed within programmable IC 115.

Configuration module 125 can send encrypted program code identified from the bitstream to decryptor 130. Once decrypted, decryptor 130 can send the decrypted program code to port 140 via signal routing circuitry 135. From port 140, the decrypted program code is provided to processor 105. As noted, processor 105 can store the decrypted program code within memory 110 and begin executing the decrypted program code.

Accordingly, in contrast to the one or more embodiments described with reference to FIG. 1, decrypted configuration data can be output from a port that is different from the port through which the encrypted program code was received. Further, the overall output path, i.e., signal routing circuitry 135 and port 140, does not exist when the encrypted program code is first received through configuration port 120. Rather, configuration data is received within programmable IC 115 substantially concurrently with the encrypted program code that causes the output path to be instantiated within programmable IC 115. It should be appreciated that various programmable ICs allow directed configuration data to be loaded to instantiate one or more smaller circuits as opposed to entire system designs.

Figure 3:
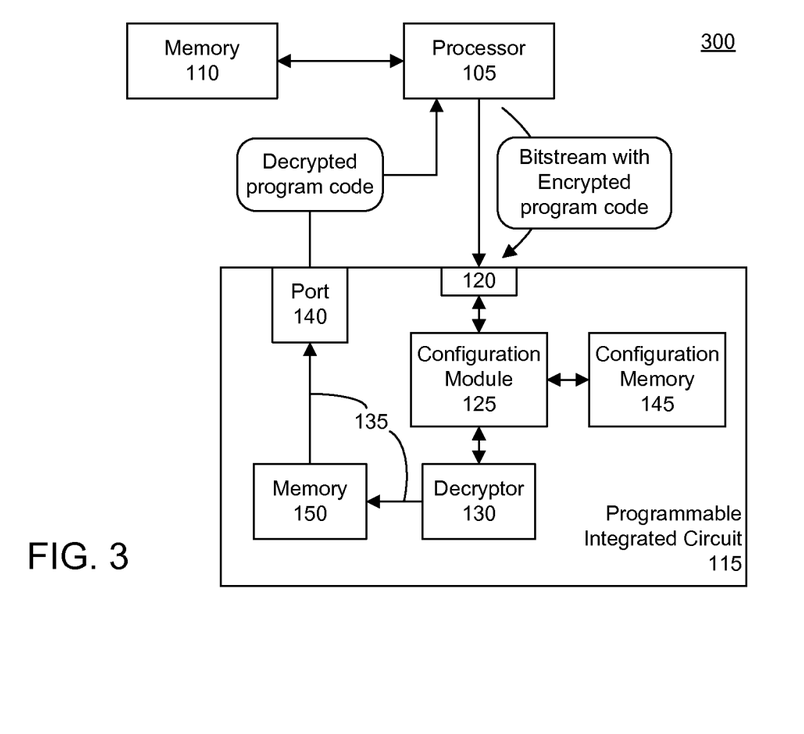
FIG. 3 is a third block diagram illustrating a system for secure processor operation in accordance with one or more other embodiments disclosed within this specification.

FIG. 3 is a third block diagram illustrating system 300 for secure processor operation in accordance with one or more other embodiments disclosed within this specification. FIG. 3 illustrates one or more embodiments in which additional circuitry is instantiated within programmable IC 115 to effectuate transfer of decrypted program code to processor 105. As shown, system 100 includes processor 105 coupled to memory 110. Programmable IC 115 includes configuration port 120, configuration module 125, decryptor 130, and configuration memory 145. In addition, signal routing circuitry 135, port 140, and memory 150 can be instantiated within programmable IC 115 as described below.

System 300 can operate substantially similar to system 200 described with reference to FIG. 2. Within system 300, however, an additional circuit component is instantiated within programmable IC 115. More particularly, memory 150 is instantiated within programmable IC 115 in addition to signal routing circuitry 135 and port 140. Memory 150 can be a "soft" memory in that memory 150 is formed from the programmable fabric or circuitry of programmable IC 115 in consequence of appropriate configuration data being loaded into configuration memory of programmable IC.

Thus, like port 140 and signal routing circuitry 135, memory 150 would not exist or be operational without the loading of configuration data into configuration memory 145 of programmable IC 115. Accordingly, subsequent to decryption of encrypted program code by decryptor 130, decryptor 130 can store the decrypted program code within memory 150. The decrypted program code can be stored within memory 150 until such time that processor 105 retrieves the decrypted program code for storage in memory 110 and/or execution.

In one or more embodiments, circuit components that are instantiated within programmable IC 115 can remain "intact" and operational to process further encrypted program code that may be received and needed by processor 105. In one or more other embodiments, however, when no further encrypted program code need be processed, programmable IC 115 can be dynamically reconfigured. In that case, the circuitry, e.g., signal routing circuitry 135, port 140, and/or memory 150, can be repurposed and used for other applications. For example, further configuration data can be loaded into programmable IC 115 and stored within configuration memory 145. Responsive to storing the configuration data within configuration memory 145, one or more or all of signal routing circuitry 135, port 145, and/or memory 150 can be reconfigured and used for other purposes, e.g., included within a user-specified circuit design.

Thus, in accordance with the one or more embodiments described with reference to FIGS. 1-3, programmable IC 115 need not be configured at all to decrypt the encrypted program code. In other cases, however, programmable IC 115 can be configured, at least partially, to facilitate different mechanisms or pathways for providing decrypted program code to processor 105. In still other case, when the mechanisms for delivering decrypted program code are no longer needed, such circuitry within programmable IC 115 can be repurposed.

For example, in one or more other embodiments, an entire circuit design can be instantiated within programmable IC 115 that can operate concurrently with, and independently of, signal routing circuitry 135, port 140, and/or memory 150. When the decrypted program code is read out of programmable IC 115, programmable IC 115 can undergo dynamic reconfiguration which effectively reprograms the circuit resources of programmable IC 115 used to implement signal routing circuitry 135, port 140, and/or memory 150, for use in a different application. For example, the resources used in forming signal routing circuitry 135, port 140, and/or memory 150 can be used by the circuit design already instantiated within programmable IC 115. Moreover, dynamic reconfiguration allows such resources to be repurposed without interrupting or stopping operation of the instantiated circuit design within programmable IC 115 in any way.

Figure 4:
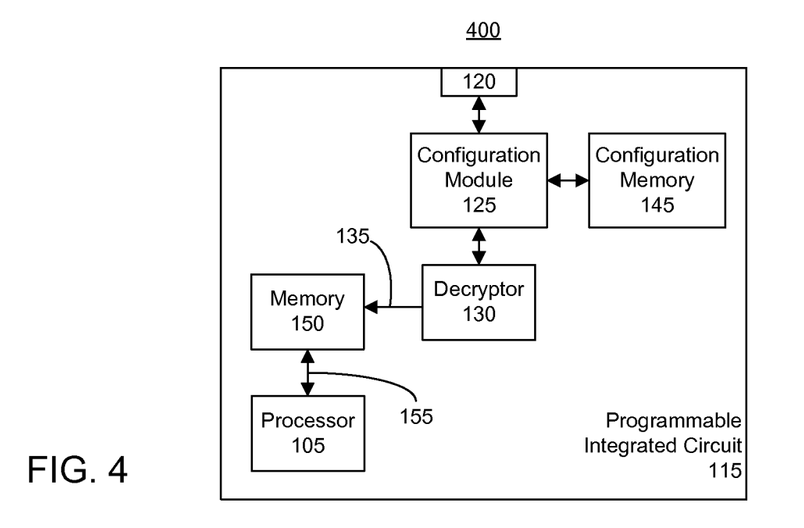
FIG. 4 is a fourth block diagram illustrating a system for secure processor operation in accordance with one or more other embodiments disclosed within this specification.

FIG. 4 is a fourth block diagram illustrating a system 400 for secure processor operation in accordance with one or more other embodiments disclosed within this specification. FIG. 4 illustrates a system in which processor 105 is embedded within programmable IC 115. In one or more embodiments, programmable IC 115 can be configured such that signal routing circuitry 135 and 155 and memory 150 are hard circuits implemented in the same way that configuration module 125 is implemented. In one or more other embodiments, signal routing circuitry 135 and 155 and memory 150 can be instantiated through the receipt of configuration data substantially concurrently with encrypted program code as described within this specification.

Figure 5:
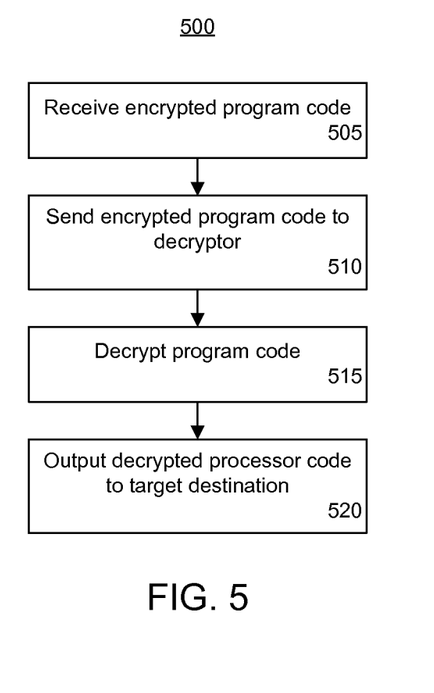
FIG. 5 is a first flow chart illustrating a method of secure processor operation in accordance with one or more other embodiments disclosed within this specification.

FIG. 5 is a first flow chart illustrating a method 500 of secure processor operation in accordance with one or more other embodiments disclosed within this specification. Method 500 can be implemented by a system as described with reference to FIGS. 1 and/or 4 of this specification. Accordingly, a programmable IC having configuration circuitry can be coupled to a processor or have a processor embedded therein.

In step 505, the programmable IC can receive encrypted program code. For example, the encrypted program code can be loaded into the programmable IC via a configuration port of the programmable IC and sent to the configuration controller. In step 510, the configuration controller can send the encrypted program code to the decryptor. In step 515, the decryptor can decrypt the encrypted program code thereby generating decrypted program code. In step 520, the decryptor can output the decrypted program code to a target destination. As used herein, "outputting" and/or "output" can mean, for example, storing in memory, sending or transmitting to another system, exporting, or the like.

The target destination, for example, can be sending the decrypted program code back through the configuration module to the processor via the configuration port. Alternatively, when the processor is embedded within the programmable IC, the decryptor can send the decrypted program code to a hard memory within the programmable IC that is accessible by the processor or directly to the processor over a hard signal path.

Method 500 allows a programmable IC to be used in securely booting a processor without first having to configure the programmable IC. The native functionality of the programmable IC that is ordinarily used for configuration of the programmable IC can be applied to decryption of program code for the processor.

Figure 6:
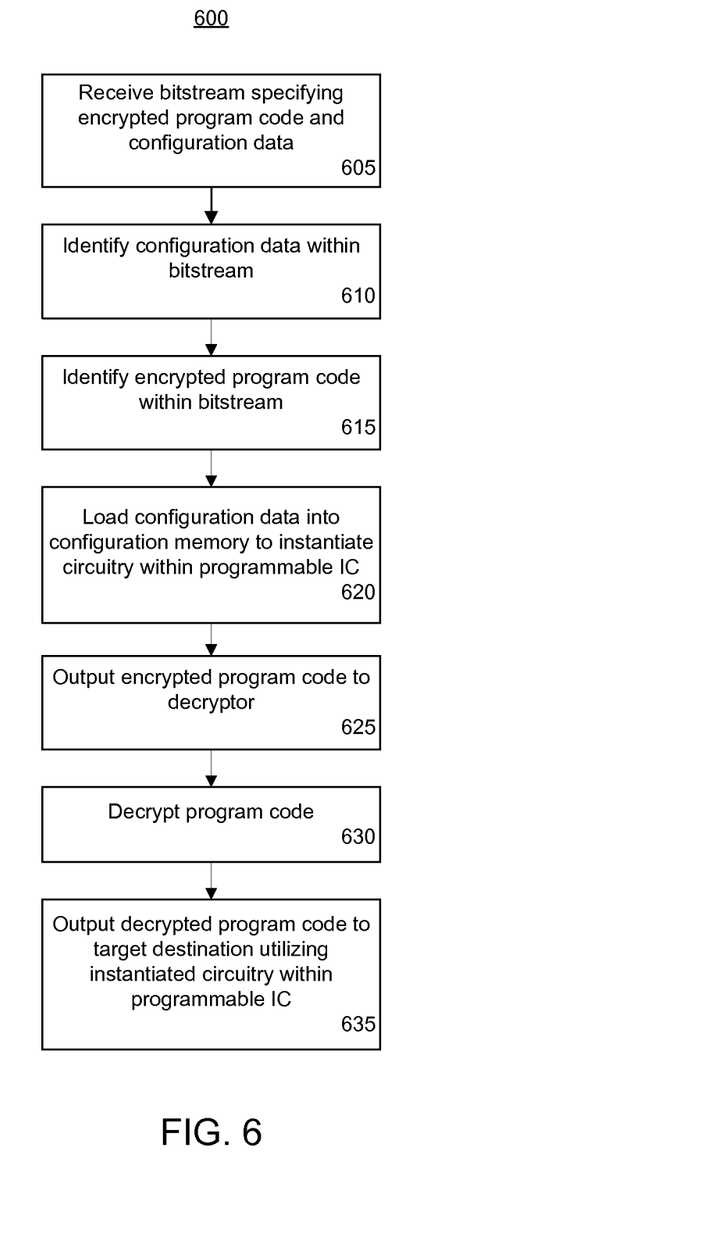
FIG. 6 is a second flow chart illustrating a method of secure processor operation in accordance with one or more other embodiments disclosed within this specification.

FIG. 6 is a second flow chart illustrating a method 600 of secure processor operation in accordance with one or more other embodiments disclosed within this specification. Method 600 can be implemented by a system as described with reference to FIGS. 2-4 of this specification. Accordingly, a programmable IC having configuration circuitry can be coupled to a processor or have a processor embedded therein.

In step 605, the programmable IC can receive a bitstream that includes both encrypted program code and configuration data. The bitstream can be received through a configuration port of the programmable IC and be provided to the configuration module. As noted, the configuration data can specify circuitry that is to be instantiated within the programmable IC. In step 610, the configuration module can identify the configuration data within the bitstream. In step 615, the configuration module can identify the encrypted program code within the bitstream. In this regard, the configuration module can distinguish between the different portions and types of data included within the received bitstream.

In step 620, the configuration module can load the configuration data into configuration memory of the programmable IC. Loading configuration data within the configuration memory instantiates the circuitry specified by the configuration data within the programmable IC. In step 625, the configuration module can output the encrypted program code to the decryptor. In step 630, the decryptor can decrypt the encrypted program code thereby generating decrypted program code.

In step 635, the decryptor can output the decrypted program code to a target destination that utilizes the circuitry instantiated within the programmable IC. The decrypted program code can be output from the programmable IC via circuitry instantiated within the programmable IC or can be stored within a memory within the programmable IC awaiting retrieval by another component or system such as the processor for execution by the processor.

Method 600 allows a programmable IC to be used in securely booting a processor. The native functionality of the programmable IC that is ordinarily used for configuration of the programmable IC can be applied to decryption of program code for the processor. Configuration data that can be received substantially concurrently with the encrypted program code can be used to instantiate circuitry within the programmable IC. The instantiated circuit can be used to store or output the decrypted program code.

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and executable instructions.

The terms "computer program," "software," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

One or more embodiments disclosed within this specification can be embodied in other forms without departing from the spirit or essential attributes thereof. Accordingly, reference should be made to the following claims, rather than to the foregoing specification, as indicating the scope of the one or more embodiments.

What is claimed is:

1. A method, comprising:
   loading encrypted program code encapsulated within a bitstream into an integrated circuit (IC) through a configuration port of the IC;
   decrypting the encrypted program code using a decryptor of the IC resulting in decrypted program code;
   wherein the decryptor and the configuration port are implemented as non-programmable hard circuitry within the IC and the decrypted program code is executable by a processor; and
   providing the decrypted program code to the processor by outputting the decrypted program code from the IC through the configuration port of the IC.

2. The method of claim 1, further comprising:
   loading configuration data specifying circuitry for implementation within programmable circuitry of the IC, wherein the circuitry specifies a data port that, when instantiated within the IC, forms a path through which the decrypted program code is provided to the processor.

3. The method of claim 2, wherein the configuration data is also encapsulated within the bitstream, the method further comprising:
   distinguishing between the encrypted program code and the configuration data.

4. The method of claim 2, wherein providing the decrypted program code to the processor further comprises:
   first instantiating the circuitry within the IC.

5. The method of claim 1, wherein the decrypted program code comprises a key, the method further comprising:
   decrypting further encrypted program code using the processor and the key from the decrypted program code.

6. The method of claim 1, wherein the IC is not yet loaded with configuration data.

7. A system comprising:
   an integrated circuit (IC) comprising:
      a configuration port configured to receive a bitstream comprising encapsulated, encrypted program code;
      a configuration module coupled to the configuration port and configured to distinguish between configuration data for the IC and the encrypted program code within the bitstream; and
      a decryptor coupled to the configuration module, wherein the decryptor is configured to decrypt configuration data for the IC that is encrypted and the encrypted program code, and generate decrypted program code;
      wherein the configuration module and the decryptor are implemented as non-programmable hard circuitry within the IC and the configuration port is further configured to output the decrypted program code from the IC; and
   a processor coupled to the IC, wherein the processor is configured to receive the decrypted program code;
   wherein the decrypted program code is executable by the processor.

8. The system of claim 7, wherein:
   the decrypted program code comprises a key; and
   the processor is operable to decrypt further program code using the key from the decrypted program code.

9. The system of claim 8, wherein:
   the configuration data is also encapsulated within the bitstream;
   the configuration module is further configured to instantiate circuitry, specified by the configuration data, within programmable circuitry of the IC; and
   the circuitry implements a data port through which the decrypted program code is provided to the processor.

10. The system of claim 9, wherein:
    the instantiated circuitry further comprises a memory coupled to the data port.

11. The system of claim 7, wherein the configuration module is further configured to output decrypted program code from the decryptor through the configuration port.

12. A method, comprising:
- loading encrypted program code encapsulated within a bitstream into an integrated circuit (IC) through a configuration port of the IC;
- decrypting the encrypted program code using a decryptor of the IC resulting in decrypted program code;
- wherein the decryptor and the configuration port are implemented as non-programmable hard circuitry within the IC and the decrypted program code is executable by a processor; and
- providing the decrypted program code to the processor by loading configuration data specifying circuitry for implementation within programmable circuitry of the IC, wherein the circuitry specifies a data port that, when instantiated within the IC, forms a path through which the decrypted program code is provided to the processor.

13. The method of claim 12, wherein the configuration data is also encapsulated within the bitstream, the method further comprising:
- distinguishing between the encrypted program code and the configuration data.

14. The method of claim 12, wherein providing the decrypted program code to the processor further comprises:
- first instantiating the circuitry within the IC.

15. The method of claim 12, wherein the decrypted program code comprises a key, the method further comprising:
- decrypting further encrypted program code using the processor and the key from the decrypted program code.

* * * * *